United States Patent
Sarashina

(10) Patent No.: US 10,063,339 B2
(45) Date of Patent: Aug. 28, 2018

(54) SLEEP CONTROL METHOD AND DYNAMIC WAVELENGTH ALLOCATION CONTROL METHOD

(71) Applicant: Oki Electric Industry Co., Ltd., Tokyo (JP)

(72) Inventor: Masahiro Sarashina, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 37 days.

(21) Appl. No.: 15/178,126

(22) Filed: Jun. 9, 2016

(65) Prior Publication Data
US 2017/0063486 A1    Mar. 2, 2017

(30) Foreign Application Priority Data

Aug. 24, 2015 (JP) .................... 2015-164895

(51) Int. Cl.

| | |
|---|---|
| H04J 14/02 | (2006.01) |
| H04W 52/02 | (2009.01) |
| H04B 10/27 | (2013.01) |
| H04B 10/11 | (2013.01) |
| H04W 88/08 | (2009.01) |

(52) U.S. Cl.
CPC .......... H04J 14/0221 (2013.01); H04B 10/11 (2013.01); H04B 10/27 (2013.01); H04J 14/0227 (2013.01); H04W 52/0206 (2013.01); H04W 88/085 (2013.01); Y02D 70/00 (2018.01); Y02D 70/1262 (2018.01)

(58) Field of Classification Search
CPC . H04J 14/0221; H04J 14/0227; H04W 52/02; H04W 88/085; H04B 10/27; H04B 10/11
See application file for complete search history.

(56) References Cited

U.S. PATENT DOCUMENTS

2015/0382290 A1* 12/2015 Yaacoub .......... H04W 52/0206
370/311

OTHER PUBLICATIONS

Go Yazawa et al., "1. Introduction" and "2. Application of TDM-PON to MFH," "Low-Latency transmission technique for mobile fronthaul based on TDM-PON system", IEICE, Sep. 2013.
Fumio Daido et al., "(3) Low Power Consumption Function", "Development of Communication LSI for 10G-EPON", Jan. 2012.

* cited by examiner

*Primary Examiner* — Leslie C Pascal
(74) *Attorney, Agent, or Firm* — Rabin & Berdo, P.C.

(57) ABSTRACT

Information about usage bandwidths of the ONUs and information about cover areas of the RRHs are acquired. A maximum cover area of each RRH is set. The remaining RRH included in the currently-set cover areas within the maximum cover area of each RRH is identified. The plurality of ONUs, a total usage bandwidth of which is smaller than or equal to an amount of traffic accommodatable by a single ONU, are identified as a sleep candidate ONU group. The ONU and the RRH to be switched to the sleep state are selected. If the maximum cover area of the RRH connected to one of the ONUs included in the sleep candidate ONU group includes a current cover area of the RRH connected to the remaining ONU, the remaining ONU and the RRH connected to them are selected as the ONU and the RRH to be switched to the sleep state.

3 Claims, 13 Drawing Sheets

SLEEP CONTROL METHOD AND DYNAMIC WAVELENGTH ALLOCATION CONTROL METHOD

CROSS REFERENCE TO RELATED APPLICATION(S)

This application is based upon and claims benefit of priority from Japanese Patent Application No. 2015-164895, filed on Aug. 24, 2015, the entire contents of which are incorporated herein by reference.

BACKGROUND

The present invention relates to sleep control of a wireless base station that utilizes a passive optical subscriber network for the connection between a base band unit and a remote radio head.

There is a technology for achieving improved throughput per unit area to accommodate rapidly-increasing mobile traffic by installing a large number of wireless base stations (small cells) having smaller cover areas than in the related art. A small cell includes a base band unit (base band unit: BBU) and a remote radio head (RRH).

The BBU performs management control and signal processing for wireless communication. For example, in long term evolution (LTE) service, the BBU modulates an internet protocol (IP) packet received from a higher-tier network into an orthogonal frequency division multiplexing (OFDM) signal and transmits the OFDM signal to the RRH. Moreover, the BBU demodulates an OFDM signal received from the RRH into an IP packet and transmits the IP packet to the higher-tier network.

The RRH amplifies an OFDM signal received from the BBU and transmits the OFDM signal to user equipment (UE) by using an antenna. Moreover, the RRH amplifies an OFDM signal received from the UE and transmits the OFDM signal to the BBU.

As a configuration that connects the BBU and the RRH, there is a central radio access network (C-RAN) configuration. In a C-RAN configuration, a plurality of BBUs are integrated in a single device, and the BBUs are respectively connected to RRHs in a one-to-one fashion by using optical fibers. Accordingly, in a C-RAN configuration, a large number of small cells can be efficiently installed.

However, in a C-RAN configuration, the number of required optical fibers is proportional to the number of installed small cells. Therefore, the cost for maintaining and setting the optical fibers undesirably increases as the number of installed small cells increases.

In view of such circumstances, the use of a passive optical network (PON) as the network between the BBU and the RRH, namely, mobile front-haul (MFH), has been proposed by, for example, Yazawa et al., "Low-latency transmission technique for mobile fronthaul based on TDM-PON system", Proceedings of the Institute of Electronics, Information, and Communications Engineers (IEICE) Society Conference, Vol. Com. 2, B-8-38, September 2013 (referred to as "Non Patent Literature 1" hereinafter).

A PON has a single optical line terminal (OLT) provided within a station, a plurality of optical network units (ONUs) individually provided in subscribers' homes, and an optical coupler. The OLT, the ONUs, and the optical coupler are connected to one another by a so-called star-type optical fiber network. In a star-type optical fiber network, a single optical fiber is used for the connection between the OLT and the optical coupler. This single optical fiber is split by the optical coupler so as to be shared by the plurality of ONUs.

In a PON, a signal (sometimes referred to as "uplink optical signal" hereinafter) to be transmitted from each ONU to the OLT is multiplexed at the optical coupler and is subsequently transmitted to the OLT. On the other hand, a signal (sometimes referred to as "downlink optical signal" hereinafter) to be transmitted from the OLT to each ONU is demultiplexed at the optical coupler and is subsequently transmitted to each ONU. In order to prevent interference between the uplink and downlink optical signals, different wavelengths are allocated to the uplink and downlink optical signals.

In a PON, various kinds of multiplexing techniques are used. Examples of multiplexing techniques used in a PON include time division multiplexing (TDM) in which a short segment on the time axis is allocated to each subscriber, wavelength division multiplexing (WDM) in which different wavelengths are allocated to the respective subscribers, and code division multiplexing (CDM) in which different codes are allocated to the respective subscribers. Non Patent Literature 1 described above proposes the use of a PON that utilizes TDM (TDM-PON) as MFH.

In the case where a PON is used as MFH, the BBU is connected to the OLT. Moreover, the RRHs are respectively connected to the ONUs in a one-to-one fashion. In a PON, the users of the respective RRHs can share the star-type optical fiber network, so that the number of required optical fibers can be reduced, as compared with a C-RAN configuration.

Nowadays, for example, the installation of star-type optical fiber networks for fiber-to-the-home (FTTH) service has been extensively completed. Therefore, by utilizing unused star-type optical fiber networks, the cost for installing new optical fibers can be reduced.

Furthermore, by accommodating the BBUs in the same station as the OLT installed for an expedited service in the related art, such as FTTH, advantages, such as a space saving configuration and reduced power consumption owing to improved bandwidth utilization efficiency, can be expected.

As a sleep technology in a PON, for example, Fumio Daido et al., "Development of Communication LSI for 10G-EPON", SEI Technical Review, No. 180, January 2012 (referred to as "Non Patent Literature 2" hereinafter) propose an ONU power saving method that is standardized based on Institute of Electrical and Electronics Engineers (IEEE) P1904.1 Standard for Service Interoperability in Ethernet Passive Optical Networks (SIEPON). In this method, the OLT first transmits a SLEEP-ALLOW signal to an ONU that is not performing communication. The ONU receiving the SLEEP-ALLOW signal transmits a SLEEP-ACK signal to the OLT. Then, the ONU that has transmitted the SLEEP-ACK signal causes a transmitter and a receiver thereof to sleep. The state of the ONU whose transmitter and receiver are sleeping is referred to as a sleep state.

The ONU in the sleep state cancels the sleep mode of the transmitter and the receiver at every specific time so as to switch to an active state. If there is no communication occurring in the ONU, the ONU switches from the active state to the sleep state again. By periodically repeating the sleep state and the active state in this manner, the ONU can maintain its connection with the OLT (i.e., establish a so-called PON link). Furthermore, when communication occurs in the ONU in the sleep state, the communication can be commenced with low delay.

Accordingly, by setting an ONU not performing communication in a sleep state, power consumption in the PON can be reduced.

SUMMARY

It is conceivable that the above-described power saving method can be similarly applied to MFH that uses a PON.

However, as already described above, in the case where a PON is to be used in a small cell, the RRHs are respectively connected to the ONUs in a one-to-one fashion. The RRHs have cover areas individually set therefor. Each RRH manages the wireless communication of an indefinite number of UEs existing in the set cover area. Therefore, wireless signals from an indefinite number of users constantly enter and exit the cover area of the RRH. Needless to say, if the RRH is set to sleep, the users become unable to perform communication in the cover area set for that RRH. Therefore, it is not preferable to set the RRH and the ONU connected to the RRH in a sleep state.

It is conceivable to set the ONU in a sleep state while maintaining the RRH in an active state. However, a power amplifier included in each RRH consumes a large amount of power. Therefore, even if the ONU is set in a sleep state, the effect of reducing power consumption decreases if the RRH is maintained in an active state.

In order to reduce power consumption in MFH that uses a PON, a new technology that can switch both of an ONU and an RRH to a sleep state is desired.

It is thus desirable to provide a method that can switch both of an ONU and an RRH to a sleep state for reducing power consumption in MFH that uses a PON.

A sleep control method according to an embodiment of the present invention has the following features.

That is, the sleep control method according to an embodiment of the present invention includes the following steps performed by a sleep controller in MFH that includes a BBU and a plurality of RRHs. The BBU and the plurality of RRHs are connected by an optical network, which includes an OLT and a plurality of ONUs, the OLT being connected to the BBU, the plurality of ONUs being connected to the OLT via an optical transmission path and also connected to the plurality of RRHs in a one-to-one fashion. The sleep controller is included in the OLT or the BBU.

The sleep controller acquires information about usage bandwidths of the ONUs and information about cover areas currently set for the RRHs.

The sleep controller sets a maximum cover area with respect to each RRH, the maximum cover area being a maximum range of cover area in which power consumption of one of the RRHs, in a case where the remaining RRH is set in a sleep state and the cover area of the one RRH is expanded to the cover area of the RRH set in the sleep state, does not exceed total power consumption of the RRHs in a case where the remaining RRH is not set in the sleep state.

The sleep controller identifies the remaining RRH included in the currently-set cover areas within the maximum cover area of each RRH based on the information about the cover areas and the maximum cover area.

The sleep controller determines whether or not a combination of the plurality of ONUs, a total usage bandwidth of which is smaller than or equal to an amount of traffic accommodatable by a single ONU, is identifiable based on the information about the usage bandwidths, and identifies the combination as a sleep candidate ONU group if the combination is identifiable.

The sleep controller selects the ONU and the RRH to be switched to the sleep state. If the maximum cover area of the RRH connected to one of the ONUs included in the sleep candidate ONU group includes a current cover area of the RRH connected to the remaining ONU included in the sleep candidate ONU group, the remaining ONU and the RRH connected to the remaining ONU are selected as the ONU and the RRH to be switched to the sleep state.

In the sleep control method according to an embodiment of the present invention, the cover area set for an RRH to be switched to a sleep state is included in the maximum cover area of an RRH to be maintained in an active state. Thus, when executing a sleep mode, the cover area of the RRH to be switched to a sleep state can be complemented by expanding the cover area of the RRH to be maintained in an active state. Therefore, the RRH and the ONU can be set in a sleep state without having to entirely reduce the cover areas after executing the sleep mode.

Furthermore, the maximum cover area of the RRH to be maintained in an active state is set as a maximum range that does not exceed the total power consumption of RRHs in a case where the other RRHs are not set in a sleep state.

Thus, even when the cover area of the RRH to be maintained in an active state is expanded, the power consumption can be reduced, as compared with a case where the other RRHs are not set in a sleep state.

DETAILED DESCRIPTION OF THE EMBODIMENT(S)

Figure 1:
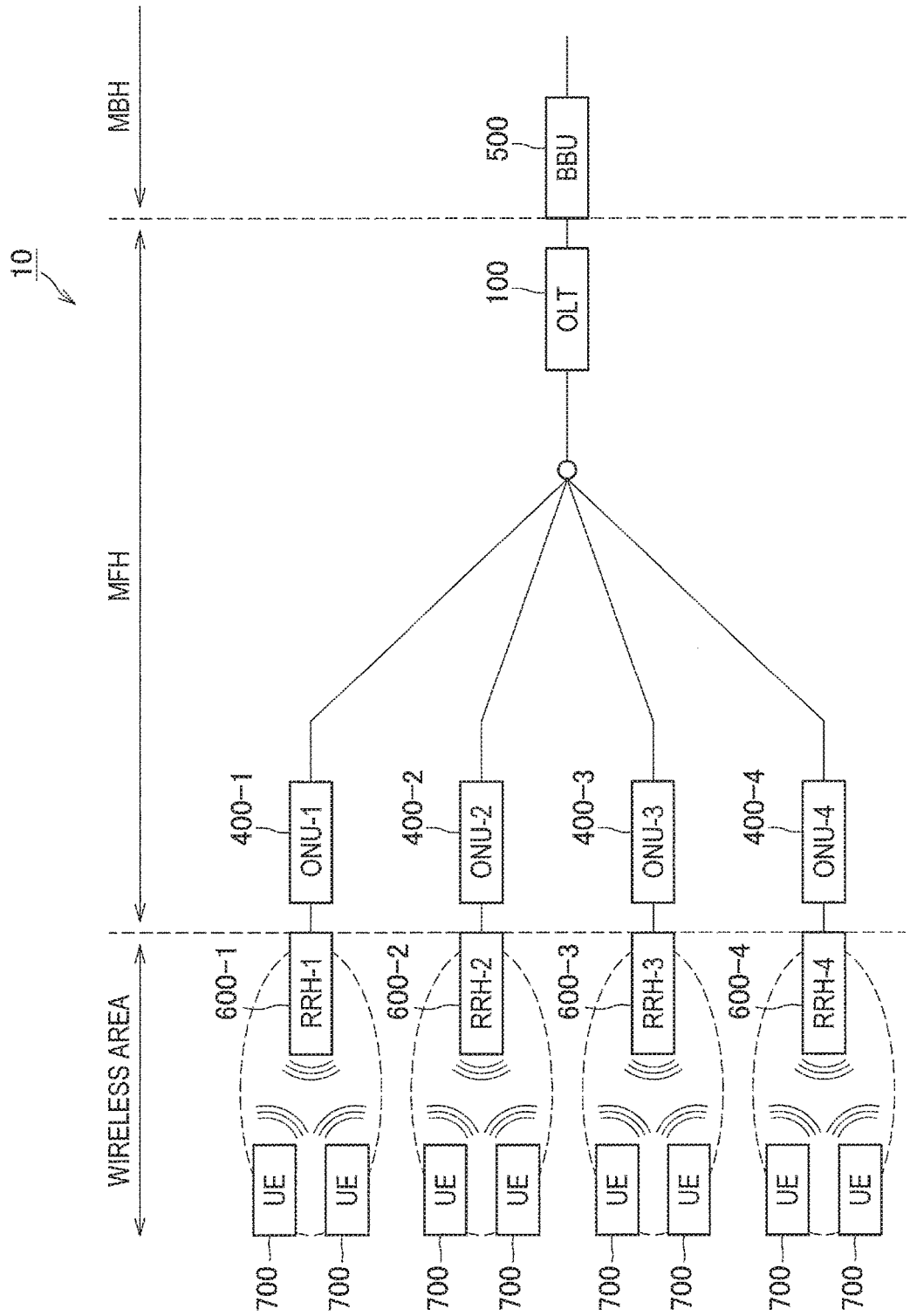
FIG. 1 is a schematic diagram of MFH that uses a TDM-PON.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

First Embodiment

MFH

A sleep control method according to this embodiment is used when configuring MFH by using a PON. First, the configuration of a MFH is configured by a PON will be described with reference to FIG. 1. The following description relates to a case where MFH is configured by a TDM-PON. FIG. 1 is a schematic diagram of MFH that uses a TDM-PON.

A MFH 10 includes a BBU 500 and a plurality of RRHs 600. The MFH between the BBU 500 and the RRHs 600 is connected by using a TDM-PON 15. The TDM-PON 15 includes an OLT 100, an optical coupler 300, and a plurality of ONUs 400. The OLT 100 is connected to the optical coupler 300 via an optical fiber. The plurality of ONUs 400 are also connected to the optical coupler 300 via optical fibers. Therefore, the optical fiber connected to the OLT 100 is split by the optical coupler 300, and the ONUs 400 are respectively connected to the split optical fibers.

The BBU 500 is connected to the OLT 100. The RRHs 600 are respectively connected to the ONUs 400 in a one-to-one fashion. In the MFH 10 that uses the PON, the OLT 100 manages the operation of each ONU 400, and the BBU 500 manages the operation of each RRH 600. Although FIG. 1 illustrates a configuration example having four RRHs 600-1 to 600-4 and four ONUs 400-1 to 400-4, the numbers of RRHs 600 and ONUs 400 are not limited to these values.

A cover area is set for each of the RRHs 600. Each RRH 600 exchanges a wireless frame with UEs 700 included in the cover area thereof. In the configuration example illustrated in FIG. 1, the cover area of each RRH 600 includes two UEs 700. The cover area of each RRH 600 is variable and can be reduced or expanded in accordance with a command from the BBU 500.

The RRHs 600 transmit uplink data received from the UEs 700 to the ONUs 400. The ONUs 400 generate uplink optical signals containing the uplink data received from the RRHs 600 and uplink control signals used for performing, for example, bandwidth requests, and transmit the uplink optical signals to the OLT 100.

The BBU 500 transmits downlink data received from a higher-tier network to the OLT 100. The OLT 100 generates a downlink optical signal containing the downlink data received from the BBU 500 and a downlink control signal used for managing each ONU 400, and transmits the downlink optical signal to the ONU 400.

In the TDM-PON 15, different wavelengths are set for the uplink and downlink optical signals. Furthermore, different transmission timings are allocated to the respective ONUs 400 to prevent overlapping of uplink optical signals from different ONUs 400. Each ONU 400 transmits an uplink optical signal at a transmission timing designated by the OLT 100 by using an allocated segment on the time axis.

Although the OLT 100 and the BBU 500 are provided separately from each other in the configuration example illustrated in FIG. 1, the OLT 100 and the BBU 500 may alternatively be accommodated in a single common station.

OLT and BBU

Figure 2:
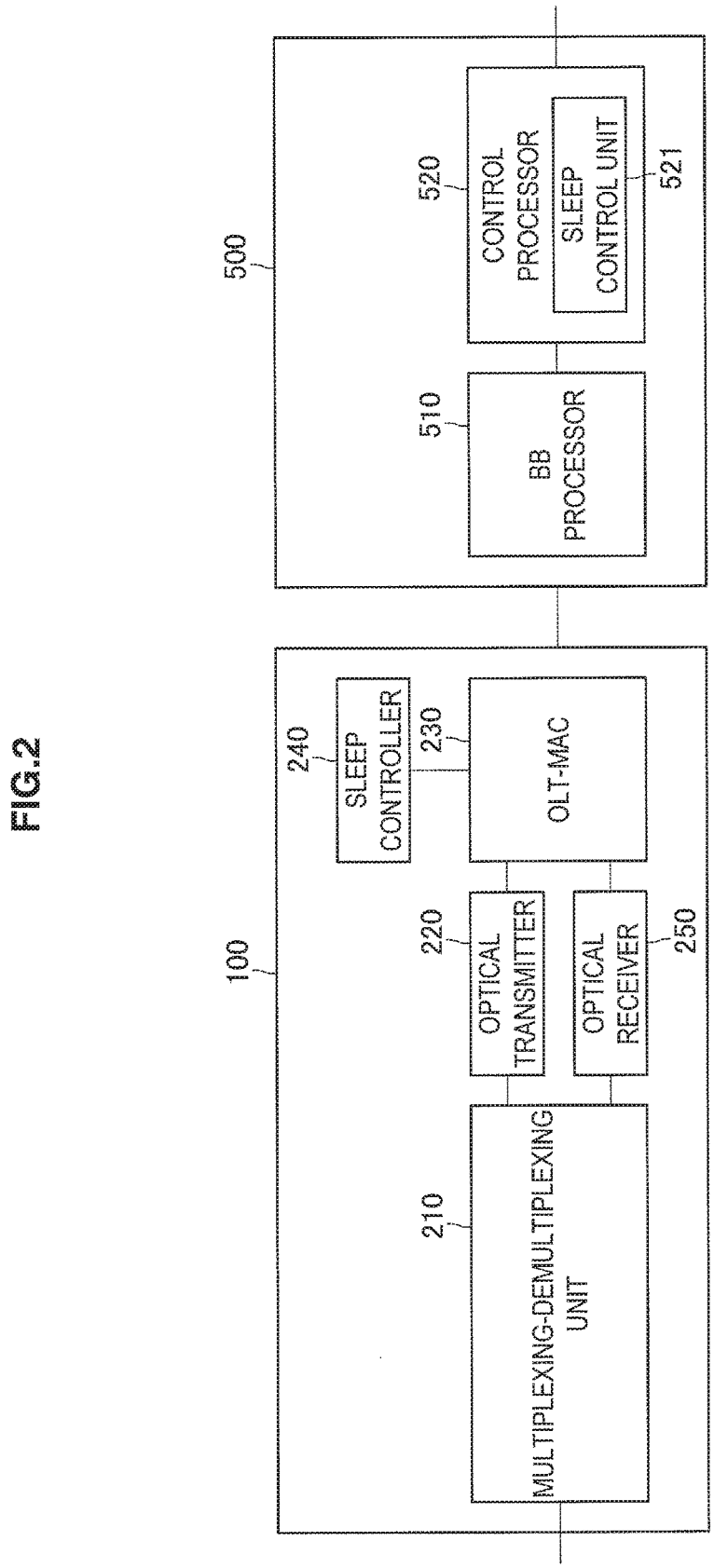
FIG. 2 is a schematic diagram of an OLT and a BBU.

An OLT and a BBU according to this embodiment will now be described with reference to FIG. 2. FIG. 2 is a schematic diagram of the OLT 100 and the BBU 500.

The OLT 100 has a multiplexing-demultiplexing unit 210, an optical transmitter 220, an OLT-MAC 230, a sleep controller 240, and an optical receiver 250.

The multiplexing-demultiplexing unit 210 multiplexes and demultiplexes downlink optical signals and uplink optical signals. The multiplexing-demultiplexing unit 210 transmits a downlink optical signal received from the optical transmitter 220 to each ONU and transmits an uplink optical signal received from each ONU to the optical receiver 250. The multiplexing-demultiplexing unit 210 has, for example, any suitable multiplexer-demultiplexer, such as a wavelength division multiplexing (WDM) filter.

The optical transmitter 220 generates a downlink optical signal from a downlink control signal and downlink data as an electric signal received from the OLT-MAC 230 and transmits the downlink optical signal to the multiplexing-demultiplexing unit 210. The optical transmitter 220 has, for example, any suitable electrical-optical converter, such as a laser diode (LD).

The OLT-MAC 230 controls the entire OLT 100. Furthermore, the OLT-MAC 230 generates a downlink control signal. The downlink control signal contains, for example, information for notifying each ONU of a sleep command and a transmission timing of an uplink optical signal. Moreover, the OLT-MAC 230 reads information contained in an uplink control signal transmitted from each ONU. The uplink control signal contains, for example, information about the bandwidth used by the ONU. These functions for, for example, generating a downlink control signal and reading an uplink control signal are realized by a program executed by the OLT-MAC 230. For example, the processing results of these functions are appropriately stored in a storage unit (not shown), such as a random access memory (RAM).

The information about the usage bandwidth read by the OLT-MAC 230 is transmitted to the sleep controller 240.

The sleep controller 240 selects ONUs and RRHs to be set in a sleep state based on the information about the bandwidths used by the ONUs received from the OLT-MAC 230 and information about the cover areas of the RRHs received from the BBU 500, which will be described later. The sleep controller 240 notifies the OLT-MAC 230 of the selected ONUs to be set in a sleep state. Moreover, the sleep controller 240 notifies the BBU 500 of the selected RRHs to be set in a sleep state. A sleep control method for the ONUs and RRHs performed by the sleep controller 240 will be described in detail later.

The optical receiver 250 converts the uplink optical signal received from the multiplexing-demultiplexing unit 210 into an electric signal and transmits the electric signal to the OLT-MAC 230. Uplink data contained in the uplink optical signal is transmitted to the BBU 500 via the OLT-MAC 230. An uplink control signal contained in the uplink optical signal is read in the OLT-MAC 230. The optical receiver 250 has, for example, a light receiving element, such as a photodiode (PD).

The BBU 500 has a baseband (BB) processor 510 and a control processor 520. The BB processor 510 and the control processor 520 can be configured similarly to those in a BBU used in MFH in the related art except that the control processor 520 has a function for performing a sleep control process. The functions of the BB processor 510 and the control processor 520 in a case where they are optimized for LTE service will be described here.

The BB processor 510 performs, for example, a multiple input multiple output (MIMO) process, a multilevel modulation and demodulation process, an adaptive modulation and channel coding (AMC) process, an automatic repeat request (ARQ) process, a power control process, an inter-cell interference control process, and a scheduling process.

The control processor 520 performs, for example, an IP-layer protocol process, a call control process, and a failure information collecting process.

Furthermore, the control processor 520 has a sleep control unit 521 as a controller. The sleep control unit 521 reads information contained in an uplink RRH control signal received from the OLT 100. The uplink RRH control signal contains information about the cover area of each RRH, such as the installation position of the RRH and the wireless output range of the RRH. The information about the cover area of each RRH read by the sleep control unit 521 is transmitted to the OLT 100. Moreover, the sleep control unit 521 generates a downlink RRH control signal. The downlink RRH control signal contains, for example, information about a sleep command and a change of cover area with respect to each RRH.

The BBU 500 demodulates, in the BB processor 510, uplink data received from the OLT 100. The uplink data has an uplink RRH control signal added thereto. The demodulated uplink data is transmitted as an IP packet to the higher-tier network. In the sleep control unit 521 of the control processor 520, information contained in the uplink RRH control signal is read.

The BBU 500 modulates, in the BB processor 510, downlink data as an IP packet received from the higher-tier network. The downlink RRH control signal generated at the sleep control unit 521 of the control processor 520 is added to the modulated downlink data, which is then transmitted to the OLT 100.

In the configuration example illustrated in FIG. 2, the sleep controller 240 is provided independently from the OLT-MAC 230. Alternatively, the sleep controller 240 may be configured as one functional unit of the OLT-MAC 230. Furthermore, the sleep controller 240 may be provided in the BBU 500 instead of being provided in the OLT 100.

ONU and RRH

Figure 3:
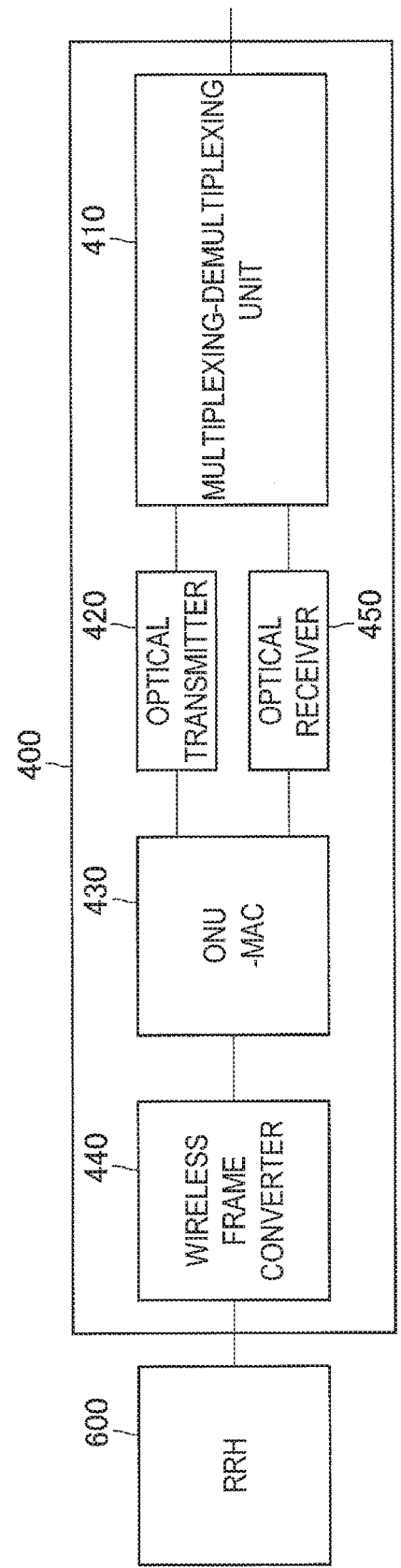
FIG. 3 is a schematic diagram of an ONU and an RRH.

An ONU and an RRH according to this embodiment will now be described with reference to FIG. 3. FIG. 3 is a schematic diagram of each ONU 400 and each RRH 600.

The ONU 400 has a multiplexing-demultiplexing unit 410, an optical transmitter 420, an ONU-MAC 430, a wireless frame converter 440, and an optical receiver 450.

The multiplexing-demultiplexing unit 410 multiplexes and demultiplexes uplink optical signals and downlink optical signals. The multiplexing-demultiplexing unit 410 transmits an uplink optical signal received from the optical transmitter 420 to the OLT and transmits a downlink optical signal received from the OLT to the optical receiver 450. The multiplexing-demultiplexing unit 410 has, for example, any suitable multiplexer-demultiplexer, such as a WDM filter.

The optical transmitter 420 generates an uplink optical signal from an uplink control signal and uplink data as an electric signal received from the ONU-MAC 430 and transmits the uplink optical signal to the multiplexing-demultiplexing unit 410. The optical transmitter 420 has, for example, any suitable electrical-optical converter, such as an LD.

The ONU-MAC 430 controls the entire ONU 400. Furthermore, the ONU-MAC 430 generates an uplink control signal. The uplink control signal contains, for example, information for notifying the OLT of a usage bandwidth. Moreover, the ONU-MAC 430 reads information contained in a downlink control signal transmitted from the OLT. The downlink control signal contains, for example, information about a sleep command and a transmission timing of an uplink optical signal. These functions for, for example, generating an uplink control signal and reading a downlink control signal are realized by a program executed by the ONU-MAC 430. For example, the processing results of these functions are appropriately stored in a storage unit (not shown), such as a RAM.

The wireless frame converter 440 converts IP-base downlink data received from the ONU-MAC 430 into a wireless frame and transmits the wireless frame to the RRH 600. Furthermore, the wireless frame converter 440 converts uplink data as a wireless frame received from the RRH 600 into an IP base and transmits the IP base to the ONU-MAC 430.

The optical receiver 450 converts the downlink optical signal received from the multiplexing-demultiplexing unit 410 into an electric signal and transmits the electric signal to the ONU-MAC 430. Downlink data contained in the downlink optical signal is transmitted to the wireless frame converter 440 via the ONU-MAC 430. A downlink control signal contained in the downlink optical signal is read in the ONU-MAC 430. The optical receiver 450 has, for example, a light receiving element, such as a PD.

The RRH 600 can be configured similarly to an RRH used in MFH in the related art.

The RRH 600 transmits downlink data as a wireless frame received from the ONU 400 to a UE. Moreover, the RRH 600 reads information contained in a downlink RRH control signal added to the downlink data. The downlink RRH control signal contains, for example, information about a sleep command and a change of cover area.

The RRH 600 adds an uplink RRH control signal to the uplink data as a wireless frame received from the UE and transmits the uplink data and the uplink RRH control signal to the ONU 400.

Sleep Control Method

Figure 4:
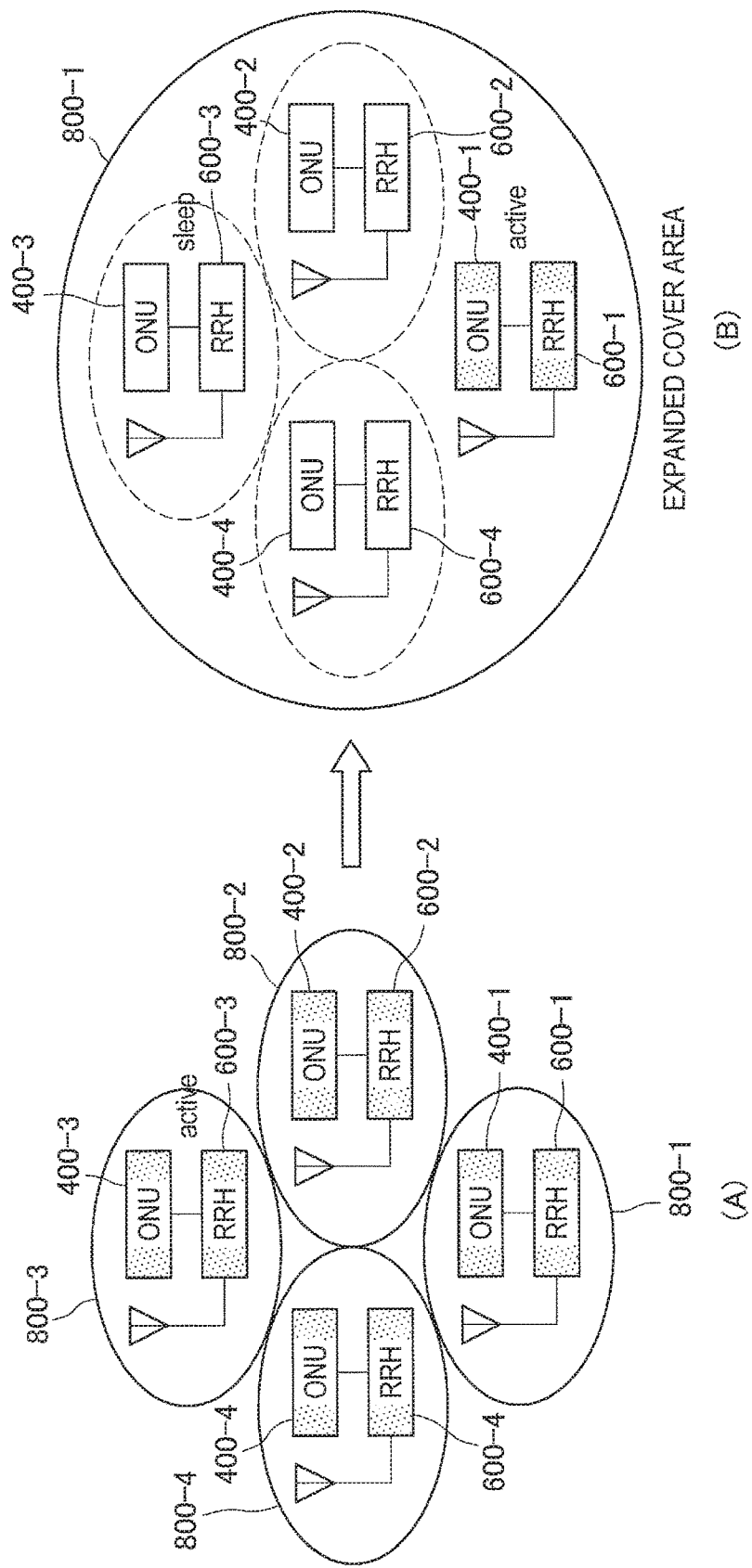
FIG. 4 is a schematic diagram for explaining the overview of a sleep control method.

An overview of a sleep control method according to this embodiment will now be described with reference to FIG. 4. FIG. 4 is a schematic diagram for explaining the overview of the sleep control method. The area illustrated in FIG. 4 has four sets of RRHs 600 and ONUs 400. The RRH 600-1 is connected to the ONU 400-1, the RRH 600-2 is connected to the ONU 400-2, the RRH 600-3 is connected to the ONU 400-3, and the RRH 600-4 is connected to the ONU 400-4. Part (A) of FIG. 4 illustrates cover areas 800-1 to 800-4 of the respective RRHs 600-1 to 600-4 in a case where all of the RRHs 600 and ONUs 400 are in an active state. Part (B) of FIG. 4 illustrates the cover area 800-1 of the RRH 600-1 in an active state in a case where three sets of RRHs 600-2 to 600-4 and ONUs 400-2 to 400-4 are in a sleep state.

In the sleep control method according to this embodiment, an RRH and an ONU that are not performing communication or an RRH and an ONU with low communication traffic among the plurality of RRHs 600 and ONUs 400 are set in a sleep state. In this case, for example, the three sets of RRHs 600-2 to 600-4 and ONUs 400-2 to 400-4 are set in a sleep state. The wireless output range of the RRH 600-1 maintained in the active state is widened so that the cover area 800-1 is expanded. In this case, the cover area 800-1 of the RRH 600-1 is expanded so as to include the cover areas previously handled by the RRHs 600-2 to 600-4 when the RRHs 600-2 to 600-4 are active. Accordingly, even after the RRHs 600-2 to 600-4 are set in a sleep state, the RRH 600-1 in the active state can handle all of the cover areas previously handled by the RRHs 600-1 to 600-4.

Accordingly, in this embodiment, the cover areas set for other RRHs 600 prior to executing a sleep mode can be complemented by expanding the cover area of an RRH 600 in an active state. Therefore, the RRHs 600 and ONUs 400 can be set in a sleep state without having to entirely reduce the cover areas after executing a sleep mode.

Figure 5:
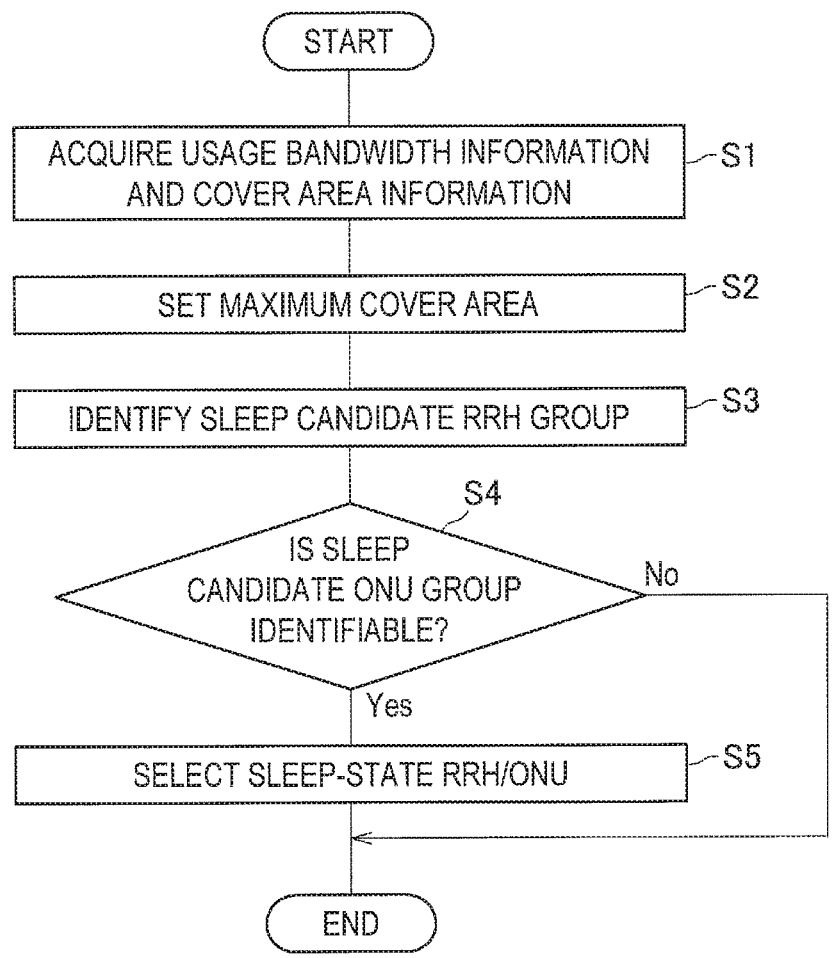
FIG. 5 is a flowchart illustrating the processing flow of the sleep control method according to a first embodiment.

Next, the processing flow of the sleep control method according to this embodiment will be described with reference to FIG. 5. FIG. 5 is a flowchart illustrating the processing flow performed by the sleep controller of the OLT in the sleep control method according to this embodiment. The sleep controller of the OLT periodically performs the processing flow illustrated in FIG. 5.

First, the sleep controller acquires information about the bandwidth used by each ONU (usage bandwidth information) from the OLT-MAC and information about the currently-set cover area of each RRH (cover area information) from the BBU (step S1). The cover area information contains information about the installation position and the wireless output range of each RRH.

Then, the sleep controller sets a maximum cover area of an RRH (step S2).

Figure 6:
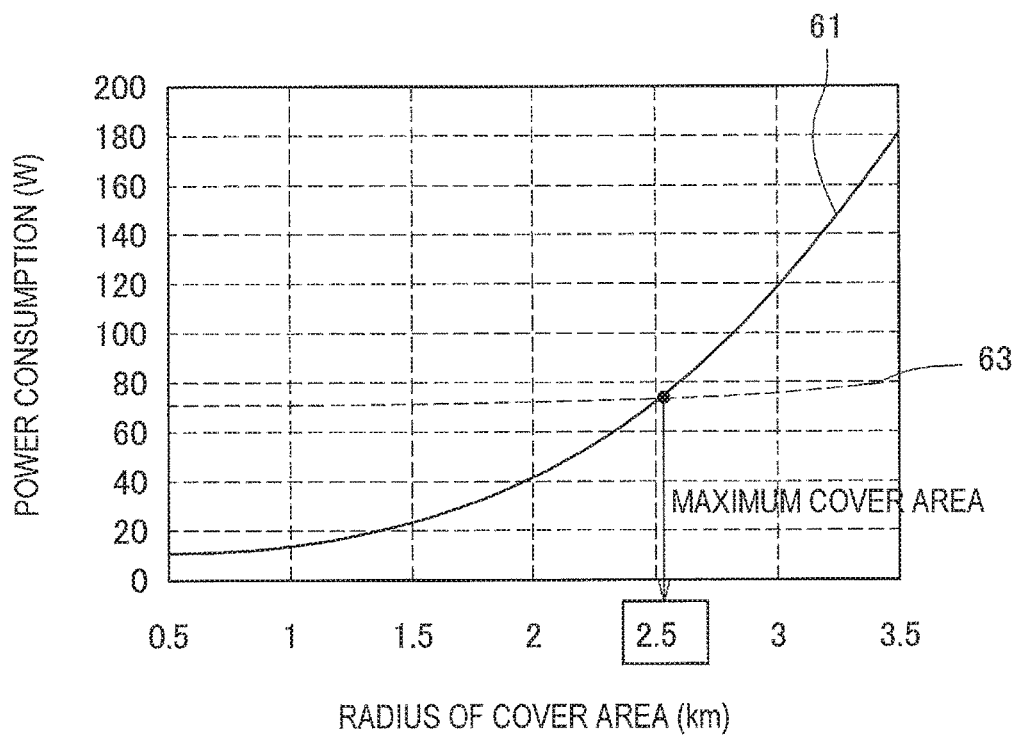
FIG. 6 illustrates the relationship between cover areas and power consumption of RRHs.

The maximum cover area is set based on, for example, the relationship between a cover area and power consumption illustrated in FIG. 6. FIG. 6 illustrates the relationship between cover areas and power consumption of RRHs. In FIG. 6, power consumption is shown in units of watts (W) on the ordinate axis, and the radius of a cover area is shown in units of kilometers (km) on the abscissa axis.

In FIG. 6, an area having seven RRHs is assumed. A solid line 61 illustrated in FIG. 6 denotes power consumption of a single RRH in an active state in a case where the single RRH is set in the active state while the other six RRHs are set in a sleep state. A broken line 63 illustrated in FIG. 6 corresponds to a case where there are no RRHs in a sleep state and denotes the total amount of power consumed by all of the RRHs when the cover area indicated on the abscissa axis is handled by the seven RRHs.

For obtaining the relationship illustrated in FIG. 6, data corresponding to a case where each RRH has an LTE-service antenna and a power amplifier is used as the parameters for the wireless output range and the power consumption.

As illustrated in FIG. 6, the power consumption (solid line 61) when a sleep mode is executed increases as the cover area expands. Therefore, when the cover area expands beyond a certain radius (2.5 km in the example in FIG. 6), the power consumption when a sleep mode is executed exceeds the power consumption (broken line 63) when a sleep mode is not executed. Hence, the maximum range of a cover area, in which the power consumption when the other RRHs are set in a sleep state and the cover area of the single RRH expands to the cover areas of the RRHs in the sleep state does not exceed the power consumption when the other RRHs are not set in the sleep state, is set as a maximum cover area for each RRH.

The maximum cover area does not have to be updated unless, for example, the RRHs are changed in position, a new RRH is installed, or a change in power consumption occurs. Therefore, the step for setting this maximum cover area may be performed once at the time of operation of the system.

Subsequently, the sleep controller identifies other RRHs included in the maximum cover area of each RRH based on the cover area information of that RRH acquired in step S1 and the maximum cover area set in step S2 (step S3).

Figure 7:
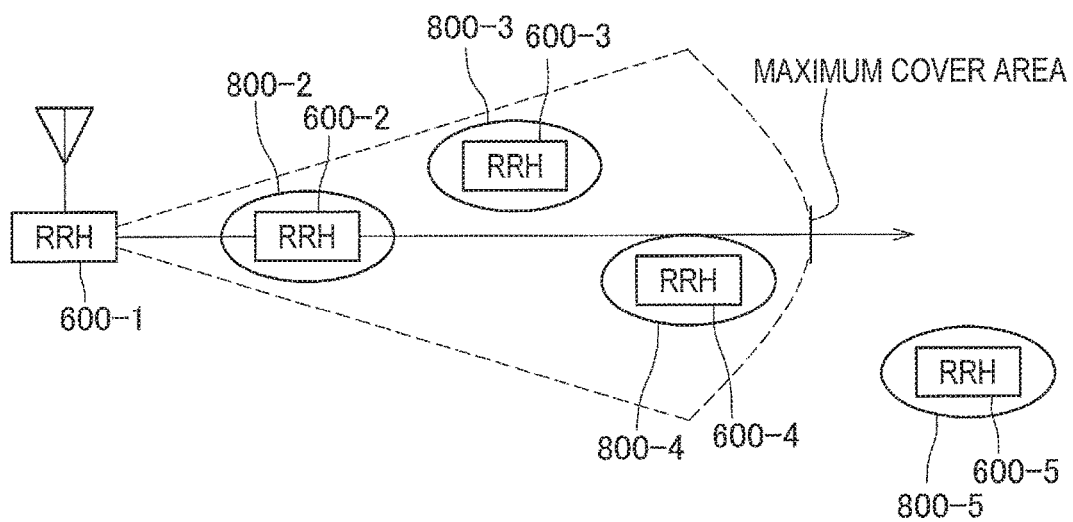
FIG. 7 illustrates the relationship between a maximum cover area of a RRH and other RRHs.

The following description with reference to FIG. 7 relates to how RRHs included in the maximum cover area are identified in step S3. FIG. 7 illustrates the relationship between the maximum cover area of a certain RRH and the other RRHs.

The area illustrated in FIG. 7 has five RRHs 600-1 to 600-5. For example, the maximum cover area of the RRH 600-1 includes the RRHs 600-2 to 600-4 within the cover area of the RRH 600-1, as well as cover areas 800-2 to 800-4 currently set for the RRHs 600-2 to 600-4. The maximum cover area of the RRH 600-1 does not include the RRH 600-5 and a cover area 800-5 currently set for the RRH 600-5. Therefore, when the maximum cover area is set for the RRH 600-1, the RRHs 600-2 to 600-4 can be set in a sleep state while power consumption can be minimized.

In step S3, it is determined whether the maximum cover area for the cover area of each RRH includes any of the other RRHs and the cover area currently set for that RRH. Consequently, a combination of RRHs that can be set in a sleep state (sleep candidate RRH group) when each RRH is set in an active state and a maximum cover area is set therefor is identified.

As mentioned above, a maximum cover area does not have to be updated unless, for example, the RRHs are changed in position, a new RRH is installed, or a change in power consumption occurs. Therefore, the step for identifying RRHs included in the maximum cover area of each RRH may be performed once at the time of operation of the system.

Subsequently, based on the usage bandwidth information of each ONU acquired in step S1, the sleep controller determines whether or not it is possible to identify a combination of ONUs (sleep candidate ONU group) whose total usage bandwidth is smaller than or equal to an amount of traffic (baseband) that can be accommodated by a single ONU (step S4).

Figure 8:
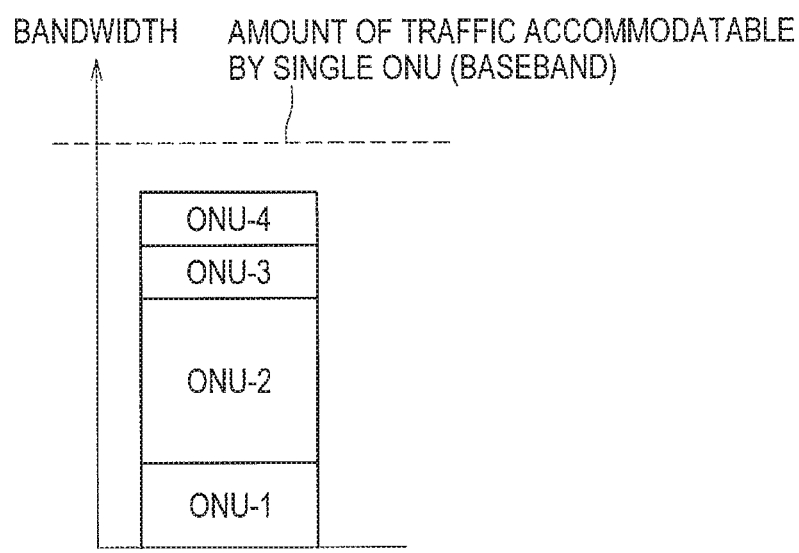
FIG. 8 illustrates the state of bandwidths used by ONUs.

The following description with reference to FIG. 8 relates to how a sleep candidate ONU group is identified in step S4. FIG. 8 illustrates the state of bandwidths used by ONUs. In FIG. 8, the state of bandwidths used by four ONU-1 to ONU-4 is illustrated as an example. Furthermore, the usage bandwidths are indicated in arbitrary units on the ordinate axis in FIG. 8.

In the example in FIG. 8, a total bandwidth used by the ONU-1 to ONU-4 is smaller than or equal to the baseband. The sleep controller identifies these plurality of ONU-1 to ONU-4 as one sleep candidate ONU group. If it is possible to identify a sleep candidate ONU group (Yes in step S4), the process proceeds to step S5. If there are multiple combinations of ONUs whose total usage bandwidth is smaller than or equal to the baseband, each combination is identified as a sleep candidate ONU group.

If the bandwidth used by each ONU is large and there is no combination in which the total usage bandwidth is smaller than or equal to the baseband, it is not possible to identify a sleep candidate ONU group (No in step S4), and the processing flow ends. In this case, the sleep controller determines not to switch any of the RRHs or ONUs to a sleep state.

In this description of the flow, a sleep candidate ONU group is identified in step S4 after a sleep candidate RRH group is identified in step S3. Alternatively, the order of step S3 and step S4 may be interchanged.

Subsequently, the sleep controller selects ONUs to be switched to a sleep state based on the sleep candidate RRH group identified in step S3 and the sleep candidate ONU group identified in step S4 (step S5).

For example, in a case where the maximum cover area of the RRH connected to the ONU-1 in the sleep candidate ONU group illustrated in FIG. 8 includes the RRHs connected to the ONU-2 to ONU-4 as a sleep candidate RRH group, the ONU-1 and the RRH connected to the ONU-1 are selected as an ONU and RRH to be maintained in an active state. Then, the ONU-2 to ONU-4 and the RRHs connected to the ONU-2 to ONU-4 are selected as RRHs and ONUs to be switched to a sleep state.

In a case where any of ONUs in a certain sleep candidate ONU group is selected as an ONU to be maintained in an active state, if the other ONUs do not correspond to the sleep candidate RRH group, an ONU to be maintained in an active state and ONUs to be switched to a sleep state are selected from a different sleep candidate ONU group that corresponds to the sleep candidate RRH group. With regard to all sleep candidate ONU groups identified in step S4, if any of the ONUs is selected as an ONU to be maintained in an active state but the other ONUs do not correspond to the sleep candidate RRH group, it is determined that none of the RRHs and ONUs is to be switched to a sleep state.

After selecting RRHs and ONUs to be switched to a sleep state, the sleep controller ends the sleep control.

The sleep controller that has completed the processing flow of the above-described sleep control method notifies the OLT-MAC of the ONUs to be switched to a sleep state. The OLT-MAC generates a downlink control signal containing a sleep command for each ONU to be switched to a sleep state.

Furthermore, the sleep controller that has completed the flow of the above-described sleep control notifies the control processor in the BBU of the RRHs to be switched to a sleep state. The sleep control unit of the control processor in the BBU generates a downlink RRH control signal containing a sleep command for each RRH to be switched to a sleep state. Moreover, the sleep control unit generates a downlink RRH control signal containing a command for expanding the cover area for the RRH to be maintained in an active state. As a result, the cover area of the RRH to be maintained in an active state is expanded to the cover areas set for the RRHs to be switched to a sleep state.

Figure 9:
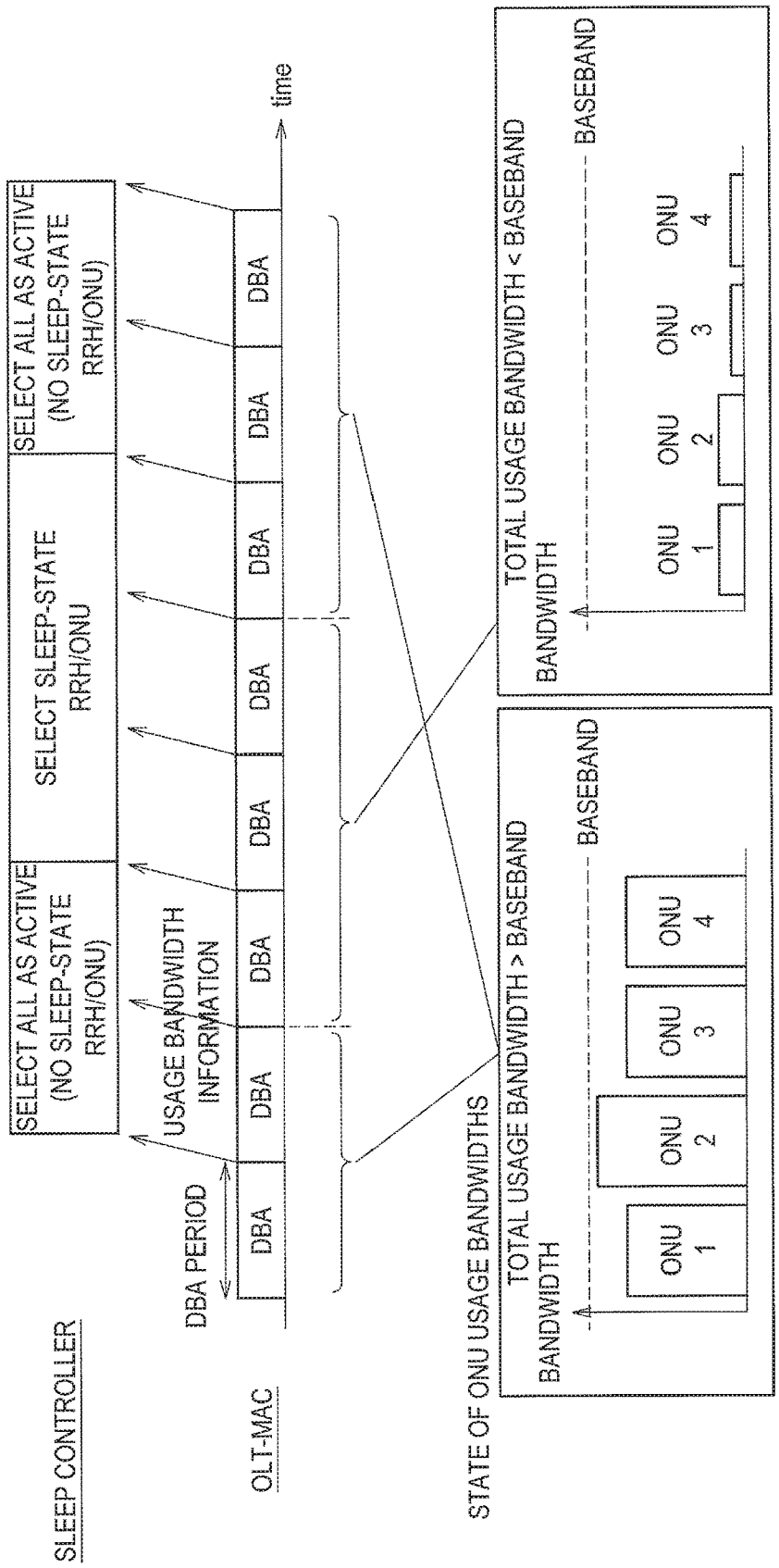
FIG. 9 is a timing chart illustrating a sleep control cycle.

Next, the cycle of the above-described sleep control process performed by the sleep controller will be described with reference to FIG. 9. FIG. 9 is a timing chart illustrating the sleep control cycle.

As already described above, the sleep controller periodically performs the processing flow illustrated in FIG. 5.

Bandwidth allocation of uplink optical signals and downlink optical signals in a PON is updated at every dynamic bandwidth allocation (DBA) period. Therefore, the minimum period for performing sleep control is a DBA period.

As illustrated in FIG. 9, the OLT-MAC notifies the sleep controller of the information about the bandwidth used by each ONU at a DBA period. The sleep controller performs the processing flow of the sleep control illustrated in FIG. 5 by using the acquired usage bandwidth information.

In a time frame in which the bandwidth used by each ONU is small, a sleep candidate ONU group can be identified. In that case, as described above, the sleep candidate RRH group corresponding to the sleep candidate ONU group is selected as RRHs and ONUs to be set in a sleep state. In contrast, in a time frame in which the bandwidth used by each ONU is large, it is not possible to identify a sleep candidate ONU group. In that case, none of the RRHs and ONUs is to be switched to a sleep state. In other words, all of the RRHs and ONUs are set in an active state.

The present inventor has studied, by simulation, the effect on power consumption in a case where the sleep control method according to this embodiment is used. In this simulation, it is assumed that seven sets of RRHs and ONUs are installed at equal distances from one another in an area with a radius of 1.25 km. Moreover, a time frame is assumed in which there is low traffic and the total bandwidth used by the seven ONUs is smaller than or equal to the baseband. Therefore, in the processing flow of the sleep control described above, the seven ONUs are identified as a sleep candidate ONU group. Furthermore, in this simulation, one set of RRH and ONU is set as an RRH and ONU (also referred to as "central RRH and ONU") to be maintained in an active state. Then, the cover area of the RRH and ONU to be maintained in an active state is expanded, and the number of other RRHs and ONUs to be switched to a sleep state is increased.

Figure 10:
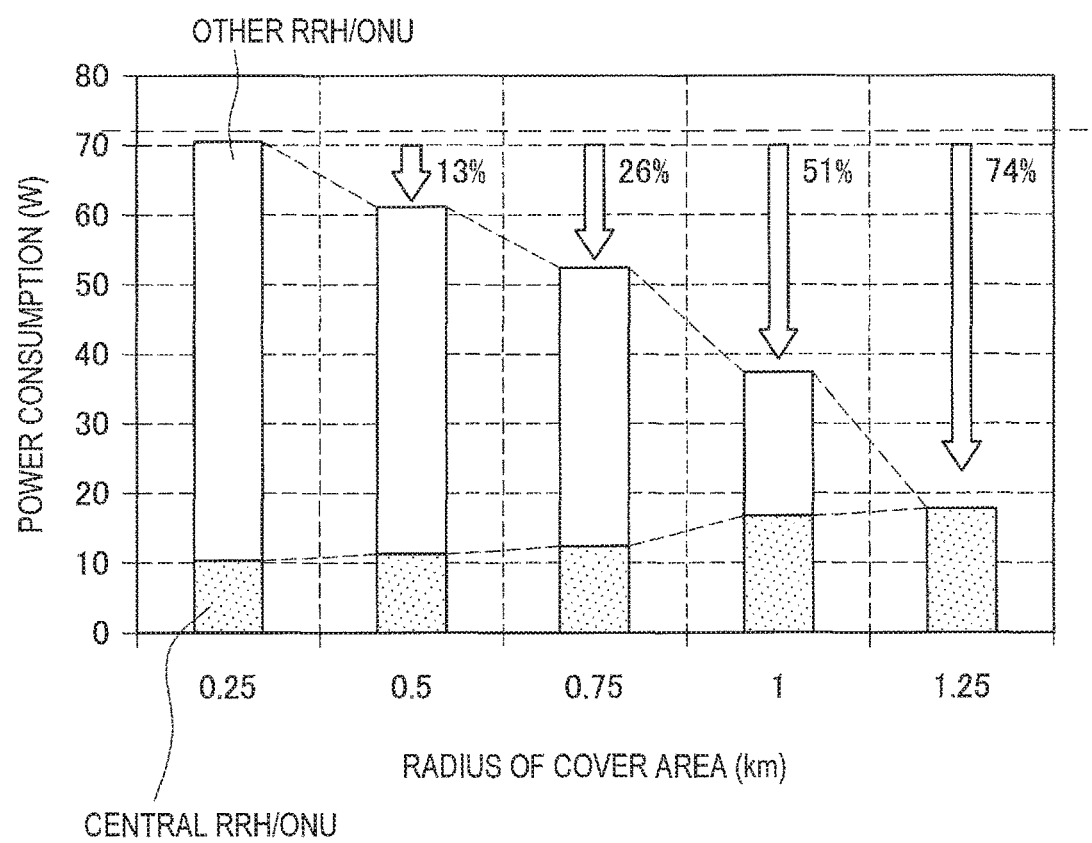
FIG. 10 illustrates simulation results.

Simulation results are illustrated in FIG. 10. FIG. 10 illustrates these simulation results. In FIG. 10, the ordinate axis denotes the total power consumption of all RRHs and ONUs in units of W, and the abscissa axis denotes the radius of the cover area of the central RRH in units of km.

Referring to FIG. 10, in a state where the radius of the cover area of the central RRH is set to 0.25 km, all of the RRHs and ONUs are in an active state, and the radius of the cover area of each RRH is set to 0.25 km. In a state where the radius of the cover area of the central RRH is set to 1.25 km, only the central RRH and ONU are in an active state, whereas the other RRHs and ONUs are in a sleep state.

As illustrated in FIG. 10, it is clear that the total power consumption decreases as the cover area of the central RRH is expanded and the number of other RRHs and ONUs in a sleep state is increased. In particular, in the case where only the central RRH and ONU are in an active state (abscissa axis: 1.25 km), the power consumption is decreased by 74%, as compared with the case where all of the RRHs and ONUs are in an active state (abscissa axis: 0.25 km).

Second Embodiment

MFH

The configuration example described in the first embodiment relates to a case where a TDM-PON is used as MFH (see FIG. 1). However, the above-described sleep control method can also be used in MFH that uses a PON (TDM/WDM-PON) that utilizes a combination of TDM and WDM as MFH. A second embodiment relates to MFH that uses a TDM/WDM-PON as MFH.

Figure 11:
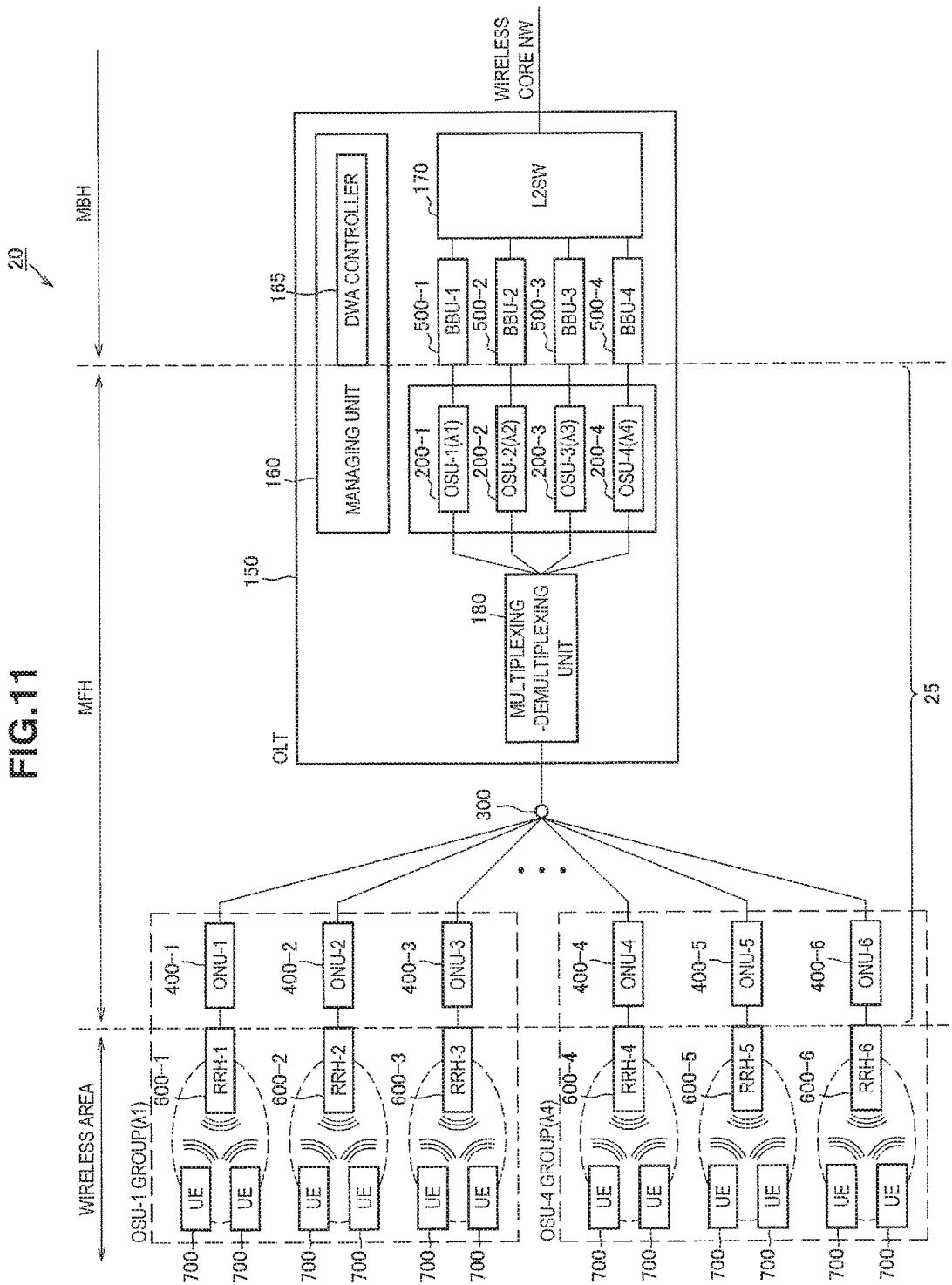
FIG. 11 is a schematic diagram of MFH that uses a TDM/WDM-PON.

First, the configuration of a small cell using a TDM/WDM-PON as MFH will be described with reference to FIG. 11. FIG. 11 is a schematic diagram of MFH that uses a TDM/WDM-PON. Elements similar to those in MFH in the first embodiment are given the same reference signs, and redundant descriptions will be omitted.

In MFH 20, the MFH between BBUs 500 and RRHs 600 is connected by using a TDM/WDM-PON 25.

The TDM/WDM-PON 25 includes an OLT 150, an optical coupler 300, and a plurality of ONUs 400. The OLT 150 has a managing unit 160, a switching element 170, a plurality of optical subscriber units (OSUs) 200, and a multiplexing-demultiplexing unit 180. The plurality of OSUs 200 are connected to the optical coupler 300 via optical fibers. The plurality of ONUs 400 are also connected to the optical coupler 300 via optical fibers.

The BBUs 500 are respectively connected to the OSUs 200 in a one-to-one fashion. The RRHs 600 are respectively connected to the ONUs 400 in a one-to-one fashion. Although the configuration example illustrated in FIG. 11 has four OSUs 200-1 to 200-4, four BBUs 500-1 to 500-4, six ONUs 400-1 to 400-6, and six RRHs 600-1 to 600-6, the numbers of OSUs 200, BBUs 500, ONUs 400, and RRHs 600 are not limited to these values.

The ONUs 400 generate uplink optical signals containing uplink data received from UEs 700 and uplink control signals used for performing, for example, bandwidth requests, and transmits the uplink optical signals to the OSUs 200.

The OSUs 200 generate downlink optical signals containing downlink data received from the BBUs 500 and downlink control signals used for managing the ONUs 400, and transmits the downlink optical signals to the ONUs 400.

In the TDM/WDM-PON 25, each ONU 400 may be registered in any one of the plurality of OSUs 200.

In the TDM/WDM-PON 25, different wavelengths are allocated to the respective OSUs 200. Each OSU 200 transmits a downlink optical signal with the allocated wavelength. Moreover, each OSU 200 receives an uplink optical signal with the allocated wavelength.

Each ONU 400 transmits an uplink optical signal with a wavelength receivable by the OSU 200 in which the ONU 400 is registered. In this case, different transmission timings are allocated to ONUs 400 registered in the same OSU 200 so as to prevent overlapping of uplink optical signals from different ONUs 400 registered in the same OSU 200. Each ONU 400 transmits an uplink optical signal at a transmission timing designated by the OLT 150 by using an allocated segment on the time axis.

In the TDM/WDM-PON 25, the ONUs 400 are managed in a distributive manner by the plurality of OSUs 200. By performing dynamic wavelength allocation (DWA) in accordance with traffic in each OSU 200, the traffic of the OSUs 200 can be averaged out.

The managing unit 160 manages information about the ONUs 400 registered in the OSUs 200 (PON link information). The managing unit 160 stores the PON link information in a storage unit (not shown), such as a random access memory (RAM), in a readable-rewritable manner. The managing unit 160 creates a transmission plan based on the PON link information and information about the traffic and the destination of downlink data received from the switching element 170. The managing unit 160 notifies the switching element 170 and the OSUs 200 of the transmission plan.

The managing unit 160 has a DWA controller 165 as a functional unit. In accordance with DWA, the DWA controller 165 distributively assigns the OSUs 200 as managers for the ONUs 400 while adjusting the number of ONUs 400 managed by each OSU 200.

The switching element 170 sets communication paths between the higher-tier network and the BBUs 500 and also between the higher-tier network and the OSUs 200 connected to the BBUs 500. Based on the transmission plan notified by the managing unit 160, the switching element 170 transmits downlink data distributively to the BBUs 500 and also transmits uplink data transmitted from the BBUs 500 to the higher-tier network. Moreover, the switching element 170 notifies the managing unit 160 of information about the traffic and the destination of downlink data transmitted from the higher-tier network.

The multiplexing-demultiplexing unit 180 multiplexes downlink optical signals with different wavelengths transmitted from the OSUs 200 and transmits the downlink optical signals to the ONUs 400. Moreover, the multiplexing-demultiplexing unit 180 demultiplexes a wavelength-multiplexed and time-multiplexed uplink optical signal transmitted from each ONU 400 for each wavelength and transmits the uplink optical signal to the corresponding OSU 200 in accordance with the wavelength.

OSU and BBU

Figure 12:
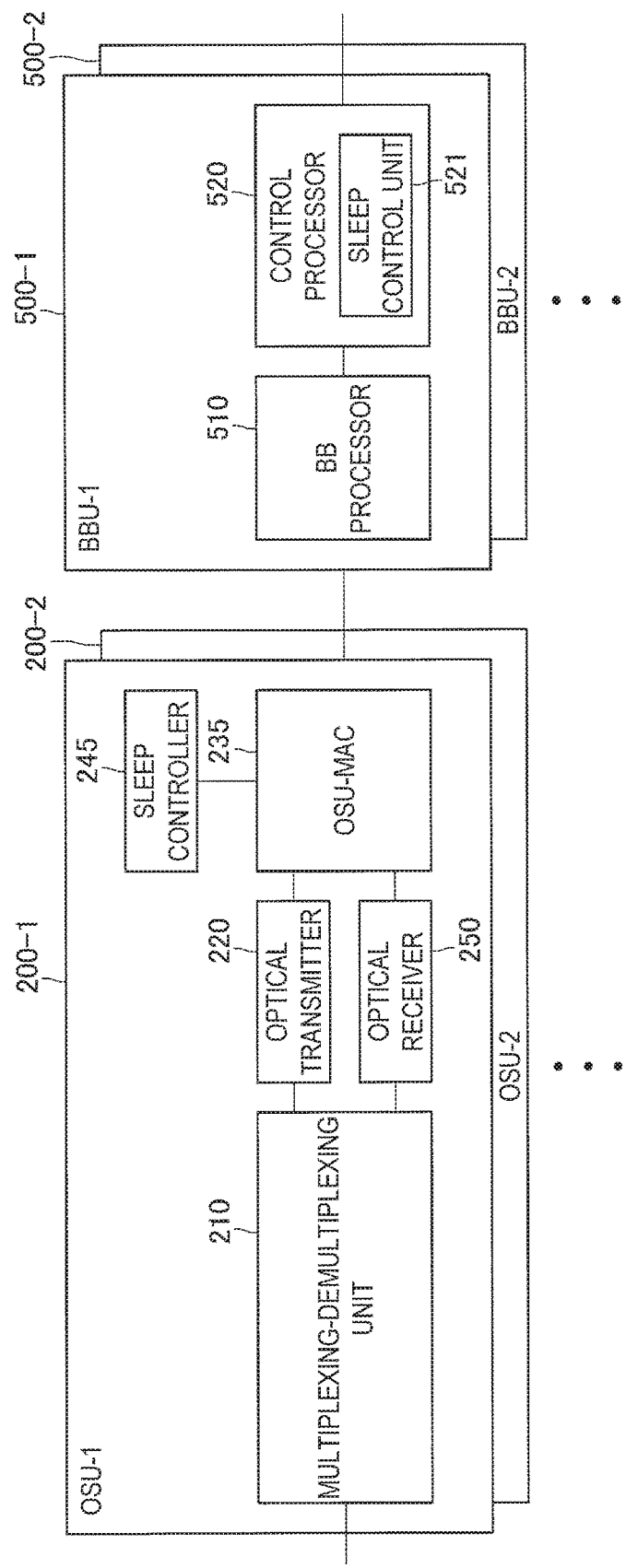
FIG. 12 is a schematic diagram of an OSU and a BBU.

An OSU and a BBU according to this embodiment will now be described with reference to FIG. 12. FIG. 12 is a schematic diagram of each OSU 200 and each BBU 500.

Each OSU 200 and each BBU 500 according to this embodiment can be configured similarly to the OLT 100 and the BBU 500 in the first embodiment described above (see FIG. 2) except that the OSU 200 has an OSU-MAC 235. Elements similar to those in the OLT 100 and the BBU 500 in the first embodiment are given the same reference signs, and redundant descriptions will be omitted.

The OSU-MAC 235 generates a downlink control signal. The downlink control signal contains, for example, information for notifying an ONU of the transmission timing and the transmission wavelength of an uplink optical signal, the reception wavelength of a downlink optical signal, and a sleep command. As already described above, in the TDM/WDM-PON 25, each ONU 400 communicates with the OSU 200, in which the ONU 400 is registered, by using a specific wavelength. Therefore, for example, if the manager for an ONU 400 is to be switched as a result of DWA, the managing unit 160 uses a downlink control signal to command the ONU 400 to transmit an uplink optical signal with a specific wavelength according to the OSU 200 serving as the transmission destination and to receive a downlink optical signal with the specific wavelength according to the OSU 200 serving as the transmission destination. Furthermore, the OSU-MAC 235 reads information contained in an uplink control signal transmitted from an ONU. The uplink control signal contains, for example, information about the bandwidth used by the ONU. These functions for, for example, generating a downlink control signal and reading an uplink control signal are realized by a program executed by the OSU-MAC 235. For example, the processing results of these functions are appropriately stored in a storage unit (not shown), such as a RAM.

The information about the usage bandwidth read by the OSU-MAC 235 is transmitted to a sleep controller 245 and the managing unit 160.

The sleep controller 245 selects ONUs and RRHs to be set in a sleep state based on the information about the bandwidth used by each ONU received from the OSU-MAC 235 and information about the cover area of each RRH received from the BBU 500. The sleep controller 245 notifies the OSU-MAC 235 and the managing unit 160 of the selected ONUs to be set in a sleep state. Moreover, the sleep controller 245 notifies the BBU 500 of the selected RRHs to be set in a sleep state.

In the configuration example illustrated in FIG. 12, the sleep controller 245 is provided independently from the OSU-MAC 235. Alternatively, the sleep controller 245 may be configured as one functional unit of the OSU-MAC 235.

Furthermore, the sleep controller 245 may be provided in each BBU 500 instead of being provided in each OSU 200. Moreover, the sleep controller 245 may be configured as one functional unit of the managing unit 160 instead of being provided in each OSU 200.

ONU and RRH

Figure 13:
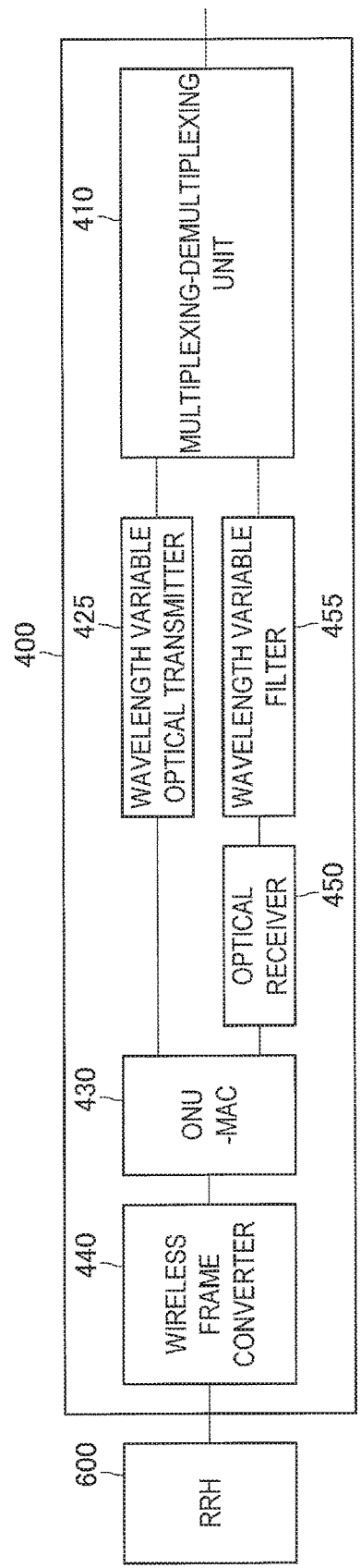
FIG. 13 is a schematic diagram of an ONU and an RRH.

An ONU and an RRH according to this embodiment will now be described with reference to FIG. 13. FIG. 13 is a schematic diagram of each ONU 400 and each RRH 600.

Each ONU 400 and each RRH 600 according to this embodiment can be configured similarly to each ONU 400 and each RRH 600 in the first embodiment described above (see FIG. 3) except that each ONU 400 has a wavelength variable optical transmitter and a wavelength variable filter. Elements similar to those in each ONU 400 and each RRH 600 in the first embodiment are given the same reference signs, and redundant descriptions will be omitted.

A wavelength variable optical transmitter 425 generates an uplink optical signal with a wavelength corresponding to an OSU serving as the transmission destination and transmits the uplink optical signal to the multiplexing-demultiplexing unit 410. A wavelength variable filter 455 is a wavelength filter that transmits light having a predetermined transparent wavelength and can change this transparent. The optical receiver 450 is provided at a subsequent stage of the wavelength variable filter 455. The ONU-MAC 430 gives an instruction about the wavelength of an uplink optical signal to the wavelength variable optical transmitter 425 based on information about a downlink control signal. Furthermore, based on the information about the downlink control signal, the ONU-MAC 430 ascertains the reception wavelength of a downlink optical signal and gives an instruction about the transmission wavelength to the wavelength variable filter 455.

Sleep Control Method and DWA Control Method

A sleep control method and a DWA control method according to this embodiment will now be described.

The sleep controller of each OSU periodically performs sleep control on each ONU that the sleep controller manages and each RRH connected to that ONU.

The period at which the sleep controller performs sleep control corresponds with the period (DWA period) at which the managing unit of the OLT performs DWA. Since the processing flow of the sleep control method according to this embodiment is similar to the processing flow in the first embodiment described with reference to FIG. 5, a description thereof will be omitted.

The sleep controller that has completed the processing flow of the sleep control notifies the OSU-MAC of each ONU to be switched to a sleep state. The OSU-MAC generates a downlink control signal containing a sleep command for each ONU to be switched to a sleep state.

Furthermore, the sleep controller that has completed the processing flow of the sleep control notifies the control processor in each BBU of each RRH to be switched to a sleep state. The sleep control unit of the control processor in the BBU generates a downlink RRH control signal containing a sleep command for each RRH to be switched to a sleep state. Moreover, the sleep control unit generates a downlink RRH control signal containing a command for expanding the cover area for the RRH to be maintained in an active state.

Moreover, the sleep controller that has completed the processing flow of the sleep control notifies the managing unit in the OLT of each ONU to be switched to a sleep state.

The DWA controller of the managing unit performs DWA based on the information about each ONU to be switched to a sleep state (sleep ONU information) received from the sleep controller of each OSU.

Figure 14:
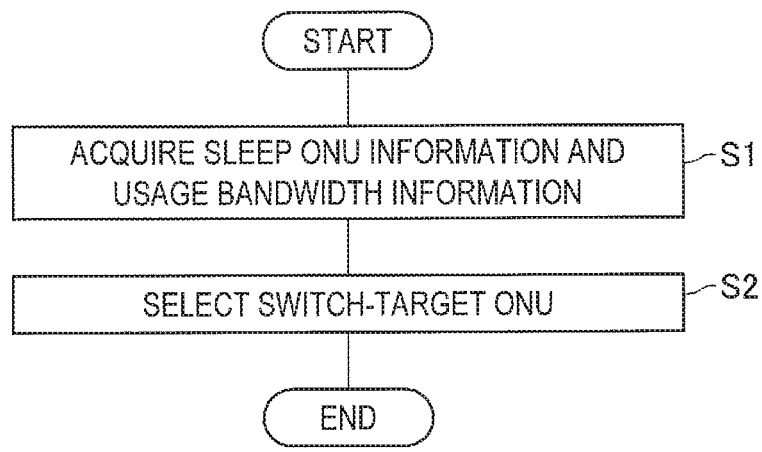
FIG. 14 is a flowchart illustrating the processing flow of a DWA control method according to a second embodiment.

The processing flow of a DWA control method according to this embodiment will now be described with reference to FIG. 14. FIG. 14 is a flowchart illustrating the processing flow performed by the DWA controller of the managing unit.

After the sleep controller of each OSU completes the processing flow of the sleep control, the DWA controller first acquires sleep ONU information from the sleep controller. Moreover, the DWA controller acquires, from the OSU-MAC of each OSU, information (usage bandwidth information) about the bandwidth used by each ONU managed by that OSU (step S1).

Then, based on the sleep ONU information and the usage bandwidth information acquired in step S1, the DWA controller selects an ONU (switch-target ONU) for which the OSU serving as the manager is to be switched (step S2).

The switching of managers for an ONU is performed based on the usage bandwidth information of each OSU so that, for example, the traffic of the OSUs is averaged out.

As described above, in the sleep control according to this embodiment, a sleep candidate ONU group including a plurality of ONUs is identified. Then, one of the ONUs in this sleep candidate ONU group is selected as an ONU to be maintained in an active state, while the other ONUs are selected as ONUs to be switched to a sleep state. After executing the sleep mode, the cover areas of the RRHs connected to the ONUs in the sleep state are included in the cover area of the RRH connected to the ONU in the active state managed by the same OSU. Therefore, it is not preferable that the ONU to be maintained in an active state and the ONUs to be switched to a sleep state, which are selected from the same sleep candidate ONU group, be managed by different OSUs.

Thus, when selecting a switch-target ONU, the DWA controller treats the ONU to be maintained in an active state and the ONUs to be switched to a sleep state, which are selected from the same sleep candidate ONU group based on the sleep ONU information, as a single ONU so as to prevent the ONUs from being managed by different OSUs.

After selecting the switch-target ONU, the DWA controller ends the DWA control process. After the DWA controller completes the DWA flow described above, the managing unit notifies each OSU and the switching element that the manager for the ONU has been switched to another one. Then, the OSU serving as the switch origin commands the switch-target ONU to change the transmission wavelength and the reception wavelength to those that correspond with the OSU serving as the switch destination. Moreover, the switching element changes the transmission destination of downlink data destined for the switch-target ONU to the BBU connected to the OSU serving as the switch destination.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A sleep control method performed by a sleep controller in a wireless base station that includes a base band unit and a plurality of remote radio heads, wherein the base band unit and the plurality of remote radio heads are connected by an optical network, which includes an optical line terminal and a plurality of optical network units, the optical line terminal being connected to the base band unit, the plurality of optical network units being connected to the optical line terminal via an optical transmission path and also connected to the plurality of remote radio heads in a one-to-one fashion, and wherein the sleep controller is included in the optical line terminal or the base band unit, the sleep control method comprising:

acquiring information about usage bandwidths of the optical network units and information about cover areas currently set for the plurality of remote radio heads;

based on the information about cover areas currently set, setting a maximum cover area with respect to each of the plurality of remote radio heads, the setting the maximum cover area including selecting a remote radio head from the plurality of remote radio heads, calculating the maximum cover area for the selected remote radio head by determining a maximum range in which a power consumption of a first state does not exceed a power consumption of a second state, the first state being that the selected remote radio head is in an active state and the plurality of remote radio heads other than the selected remote radio head are in a sleep state, and the second state being that all of the plurality of remote radio heads are in an active state, and setting the maximum cover area calculated for the selected remote radio head as the maximum cover area for each of the plurality of remote radio heads;

identifying one or more remote radio heads as candidates for being placed into the sleep state, the identifying including, for each remote radio head of the plurality of remote radio heads, determining whether a current cover area of the remote radio head is within the maximum cover area of another remote radio head, and if so, identifying the remote radio head as a candidate for being placed into the sleep state;

identifying one or more combinations of optical network units as candidates for being placed into the sleep state, the identifying including determining whether a combination of ones of the optical network units of the plurality of optical network units has a smaller total usage bandwidth than can be accommodated by a single optical network unit, and if so, identifying the combination as a candidate for being placed into the sleep state; and selecting one or more combinations of optical network units from the one or more combinations of optical network units identified as candidates for being placed into the sleep state, and selecting one or more remote radio heads from the remote radio heads identified as candidates for being placed into the sleep state, and placing the selected one or more combinations of optical network units and the selected one or more remote radio heads into the sleep state.

2. A sleep control method performed by a sleep controller in a wireless base station that includes a plurality of base band units and a plurality of remote radio heads, wherein the plurality of base band units and the plurality of remote radio heads are connected by an optical network, which includes an optical line terminal and a plurality of optical network units, the optical line terminal including optical subscriber units connected to the plurality of base band units in a one-to-one fashion, the plurality of optical network units being connected to the optical line terminal via an optical transmission path and also connected to the plurality of remote radio heads in a one-to-one fashion, wherein different wavelengths are allocated to the plurality of optical subscriber units, and wherein the sleep controller is included in each optical subscriber unit, the optical line terminal, or the base band units, the sleep control method comprising:

acquiring information about usage bandwidths of the optical network units and information about cover areas currently set for the plurality of remote radio heads;

based on the information about cover areas currently set, setting a maximum cover area with respect to each of the plurality of remote radio heads, the setting the maximum cover area including selecting a remote radio head from the plurality of remote radio heads, calculating the maximum cover area for the selected remote radio head by determining a maximum range in which a power consumption of a first state does not exceed a power consumption of a second state, the first state being that the selected remote radio head is in an active state and the plurality of remote radio heads other than the selected remote radio head are in a sleep state, and the second state being that all of the plurality of remote radio heads are in an active state, and setting the maximum cover area calculated for the selected remote radio head as the maximum cover area for each of the plurality of remote radio heads;

identifying one or more remote radio heads as candidates for being placed into the sleep state, the identifying including, for each remote radio head of the plurality of remote radio heads, determining whether a current cover area of the remote radio head is within the maximum cover area of another remote radio head, and if so, identifying the remote radio head as a candidate for being placed into the sleep state;

identifying one or more combinations of optical network units as candidates for being placed into the sleep state, the identifying including determining whether a combination of ones of the optical network units of the plurality of optical network units has a smaller total usage bandwidth than can be accommodated by a single optical network unit, and if so, identifying the combination as a candidate for being placed into the sleep state; and selecting one or more combinations of optical network units from the one or more combinations of optical network units identified as candidates for being placed into the sleep state, and selecting one or more remote radio heads from the remote radio heads identified as candidates for being placed into the sleep state, and placing the selected one or more combinations of optical network units and the selected one or more remote radio heads into the sleep state.

3. A method performed subsequently to the sleep control method according to claim 2, the subsequent method being performed by a managing unit of the optical line terminal and comprising:

acquiring information about an optical network unit to be switched to the sleep state and the information about the usage bandwidths of the optical network units; and treating a first optical network unit, of the one or more combinations of optical network units identified as candidates for being placed into the sleep state, the first optical unit to be maintained in an active state, and a second optical network unit, of a same one of the one or more combinations of optical network units identified as candidates for being placed into the sleep state as the first optical network unit, the second optical network unit to be switched to the sleep state, as a single optical network unit for management by the managing unit, based on the acquired information about the optical network unit to be switched indicating the sleep state.

* * * * *